United States Patent [19]

Marquis et al.

[11] 4,239,700

[45] Dec. 16, 1980

[54] ISATOIC ANHYDRIDE DERIVATIVES AND USE AS CHAIN-EXTENDERS

[75] Inventors: Edward T. Marquis; Ernest L. Yeakey, both of Austin, Tex.

[73] Assignee: Texaco Development Corp., White Plains, N.Y.

[21] Appl. No.: 41,360

[22] Filed: May 22, 1979

Related U.S. Application Data

[62] Division of Ser. No. 949,833, Oct. 10, 1978, Pat. No. 4,194,070.

[51] Int. Cl.$^3$ ............................................ C07C 103/22
[52] U.S. Cl. .................................... 564/157; 528/354; 564/163; 564/166; 564/167
[58] Field of Search ........................ 260/558 A, 559 A; 528/354

[56] References Cited

U.S. PATENT DOCUMENTS

| | | | |
|---|---|---|---|
| 3,654,364 | 4/1972 | Meckel et al. | 528/68 |
| 3,712,927 | 1/1973 | Howe et al. | 260/558 A |
| 3,789,073 | 1/1974 | Narayanan et al. | 260/558 A |
| 3,876,569 | 4/1975 | Priest et al. | 521/163 |
| 4,010,189 | 3/1977 | Smith | 260/558 A |
| 4,049,716 | 9/1977 | Collet | 521/163 |

Primary Examiner—Maurice J. Welsh
Attorney, Agent, or Firm—Carl G. Ries; Robert A. Kulason; James L. Bailey

[57] ABSTRACT

Covers certain aromatic-amine amides which comprise the reaction product of a bis-amino-n propyl ether and an isatoic anhydride of the formula:

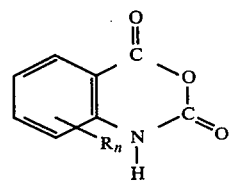

where R is selected from the group consisting of hydrogen, alkyl, nitro, halo, hydroxy, amino, and cyano, and n is a number of 1-4. Also covers the use of said compounds as chain-extenders in polyurethane compositions. Such chain-extenders provide for the production of polyurethane elastomers having improved tensile strength, tear strength and elongation properties.

5 Claims, No Drawings

ISATOIC ANHYDRIDE DERIVATIVES AND USE AS CHAIN-EXTENDERS

This is a division, of application Ser. No. 949,833, filed Oct. 10, 1978 now U.S. Pat. No. 4,194,070 issued Mar. 18, 1980.

BACKGROUND OF THE INVENTION

When an organic polyisocyanate is reacted with a polyether polyol to produce a polyurethane composition, various components are introduced into the system in order to adjust the physical properties of the resulting polyurethane composition. For example, if a cellular product is desired, water or an appropriate blowing agent is added to the polyurethane reaction mixture. In order to adjust properties of various polyurethane compositions such as the tensile strength, elongation, tear strength, flexibility, the softness or hardness of the resulting composition, or the color, various other additives are used. Often the addition of the additive to improve one particular property results in the degradation of other properties of the polyurethane composition. For instance, an additive which increases the tensile strength of a solid polyurethane composition, such as various fillers, may result in a decrease in the elongation of the resulting polyurethane composition. Therefore, it is necessary to achieve a balance of properties of a given use.

Solid polyurethane compositions have found usefulness in gaskets, sealants, floor coverings, and the like. More recently, with the advent of molded, rigid plastics, it has become desirable to provide a flexible polyurethane mold for use in the place of the more expensive silicone-type molds currently being used. In order for a polyurethane composition to be acceptable for this use, it must be soft and flexible, yet have good tensile and tear strength so that the mold does not become unusable after a short period of time due to tears or splits in the mold material. Heretofore, polyurethane compositions have not been acceptable for this purpose.

Polyurethane compositions generally in use as floor coverings are systems dissolved in a solvent which are moisture-cured by the atmosphere after application on the floor. These floor coatings have been found to suffer considerably from "bleed through", especially when placed on a substrate which had previously been covered with some other type of floor covering. While there are some single component floor coatings (i.e., solvent types), these have been found to be lacking in one or more of the desired properties for an acceptable floor coating. To be an acceptable floor covering composition, it is desirable that the elastomer be strong, scuff-resistant and yet flexible enough to conform to shifts in the floor.

With the widespread use of foam crash pads in automobiles and the like, it has become desirable to develop a crash pad with a tough scuff-resistant skin which is integral to the foam of the crash pad itself. Previously, it was necessary to line the mold in which the crash pad was to be cast with a decorative coating such as vinyl and the like in order to achieve the strength and scuff-resistance necessary for the pad, and yet maintain an attractive appearance of the crash pad itself. Previous attempts at producing a polyurethane foam crash pad having an integral skin which would meet these qualifications have met with considerable difficulty and disappointing results.

The advantages and objects of our invention will be apparent to those skilled in the are, in view of the aforementioned background, the following discussion and accompanying examples.

SUMMARY OF THE INVENTION

This invention relates to aromatic amine-amide compositions which comprise a reaction product of a bis-amino-n propyl ether and an isatoic anhydride of the formula:

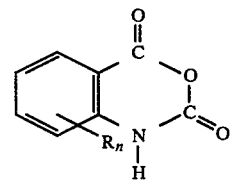

where R is selected from the group consisting of hydrogen, alkyl, nitro, halo, hydroxy, amino, and cyano, and n is a number of 1–4.

The invention also relates to the production of polyurethane compositions having improved physical properties due to presence of the above compounds which act as chain-extenders.

The chain-extender of the invention is incorporated into the reaction mixture of an organic isocyanate and an organic polymeric polyhydroxy compound such as polyester or polyether polyols used for the production of polyurethane compositions, along with a urethane catalyst and various additives frequently used in the polyurethane art.

DETAILED DESCRIPTION OF THE INVENTION

Particularly preferred chain-extenders derived from certain bis-amino-n-propyl ethers have the following structural formula:

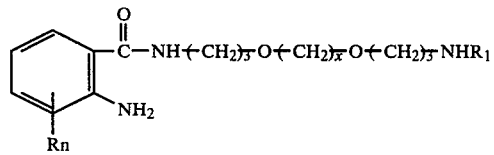

where $R_1$ is hydrogen or:

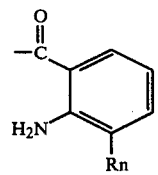

and x is a number ranging from 2 to 6 or

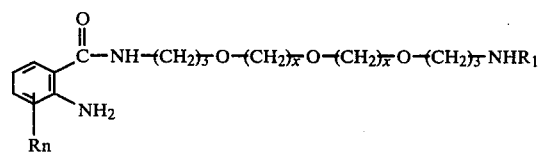

In order to prepare the above compounds an isatoic anhydride of the formula:

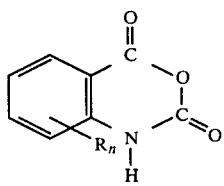

where R is selected from the group consisting of hydrogen, alkyl, nitro, halo, hydroxy, amino, and cyano, and n is a number of 1–4, is reacted with a bis-amino-n-propyl ether. The isatoic anhydrides are well known materials, and their preparation need not be discussed in detail. A preferred reactant is isatoic anhydride itself, where $R_n$ is H.

The bis-amino-n-propyl ether reactant is either

or

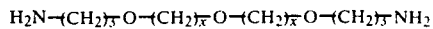

The above bis-amino ethers may be prepared via a number of known methods. Preferably they are made by first providing known diols or glycol ethers having the following formulae:

or

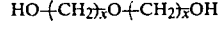

These diols and glycol ethers are then reacted with acrylonitrile by known procedures to produce the dipropyl-dinitrile derivative which in turn are hydrogenated by known methods to produce the diamines. Use of a nickel catalyst is typical in the hydrogenation step.

In order to make the products of the invention, the bis-amino ethers and isatoic anhydride are simply mixed together without necessity of solvent or diluent and heated. When the reaction is finished, the product requires no further treatment or purification. In addition, no catalyst is necessary to effect the reaction. The products are generally viscous liquids (pourable when warm) rather than crystalline solids. The temperature of reaction may range from about 20° C. to about 200° C. at a pressure ranging from atmospheric pressure to about 1000 psig.

When one mole of the isatoic anhydride is added per mole of diamine only one of the terminal amine groups is reacted to produce a monoamide also containing one aromatic and one aliphatic amine group. On the other hand if two moles of the anhydride are reacted with one mole of the diamine both terminal groups are reacted to produce a diamide structure containing two aromatic amine groups.

The above chain-extenders are particularly useful in preparing improved solid polyurethane compositions useful as sealants, floor coatings and molds. In addition, when employing the additives of the invention one may provide an integral skin on a foamed cellular polyurethane composition containing the chain-extenders of the invention. This integral skinned cellular polyurethane composition produces a product having the desired properties of a foam crash pad in addition to having a tough, scuff-resistant integral skin, thus, obviating the necessity of lining the mold with a separate skinning material.

As noted above in the production of polyurethane compositions, polymeric polyhydroxy compounds such as polyester or polyether polyols are reacted with organic polyisocyanates to produce a polyurethane composition. Polyether polyols are described herein, and polyester polyols are described in U.S. Pat. No. 3,391,093 for example. This reaction usually occurs in the presence of a catalyst but may occur noncatalytically when a polyol containing a tertiary nitrogen atom is used. In the practice of the invention, the above-described chain-extenders are included in this reaction mixture to produce improved polyurethane compositions. When a solid polyurethane composition is produced using the chain-extender of the invention, we have discovered that improved tensile strength, tear strength and elongation results. With the chain-extender of our invention, strong yet flexible floor coverings and sealants are possible. In addition, soft, flexible molds can be produced which have improved tear strength but yet have sufficient compression strength to withstand pressures produced when the mold made from our polyurethane composition must contain an expanding cellular plastic.

Suitable organic polyisocyanates useful in the practice of our invention are those organic diisocyanates, triisocyanates and polyisocyanates well-known in the polyurethane art. Mixed isomers of toluene diisocyanate which are readily commercially available such as those described in U.S. Pat. No. 3,298,976 and the like may be used. Especially preferred are diisocyanates and polyisocyanates prepared by the phosgenation of the reaction product between aniline and formaldehyde such as 4,4'-diphenylmethane diisocyanate, 2,4'-diphenylmethane diisocyanate and higher functionality polyphenylmethylene polyisocyanates, hereinafter called polyarylpolyisocyanates. Especially preferred organic polyisocyanates for forming solid polyurethane compositions are diphenylmethane diisocyanate and modified diphenylmethane diisocyanates sold under the trademark of ISONATE® 143L. Polyarylpolyisocyanates which are used in the practice of our invention, particularly to produce cellular polyurethanes, have a functionality of from about 2.0 to about 3.3. An especially preferred functionality range is from about 2.2 to about 2.9.

Polyether polyols useful in the practice of our invention are those diols, triols, tetrols and mixtures thereof having a molecular weight from about 500 to about 10,000. The diols are generally polyalkylene ether glycols such as polypropylene ether glycol, polybutylene ether glycol, and the like, and mixtures thereof. Mixed polyether polyols can also be used such as the condensation products of an alkylene oxide with a polyhydric alcohol having three or four primary hydroxyl groups such as glycerol, trimethylolpropane, 1,2,6-hexanetriol, pentaerythritol, and the like. These polyether polyols are well-known and may be prepared by any known process such as, for example, the processes discussed in Encyclopedia of Chemical Technology, volume 7, pages 257–262, published by Interscience Publishers, Inc. in 1951.

As mentioned above, any suitable polyhydric polyalkylene ether may be used, such as, for example, the condensation product of an alkylene oxide with a polyhydric alcohol. Any suitable polyhydric alcohol may be used such as, for example, ethylene glycol, 1,2-propylene glycol, 1,3-propylene glycol, 1,4-butylene glycol, 1,3-butylene glycol, glycerine, trimethylolpropane, 1,2,6-hexanetriol, pentaerythritol, and the like. Any suitable alkylene oxide may be used such as, for example, ethylene oxide, propylene oxide, butylene oxide, amylene oxide, their various isomers, and the like. Of course, the polyhydric polyalkylene ether polyols can be prepared from other starting materials such as, for example, tetrahydrofuran, epihalohydrin, aralkylene oxides such as, for example, styrene oxide, and the like. Polyhydric polyether polyols having three or four hydroxyl groups per molecule and a molecular weight of from about 2,000 to about 10,000 can be used. The polyol used can be a blend of diols with triols or tetrols to produce a polyol blend having an average molecular weight of from about 500 to about 10,000. Blended diols and triols for use in solid polyurethane elastomers are generally discussed in U.S. Pat. No. 3,391,101. Most preferred for use either alone or blended with a diol are the polyoxyalkylene triols and tetrols having a molecular weight of from about 2,000 to about 7,000.

The polyether polyols may have primary or secondary hydroxyl group termination. When the polyhydric alcohol is reacted with an alkylene oxide such as propylene oxide, butylene oxide, and the like, the terminal groups are predominantly secondary hydroxyl groups. However, it is within the scope of our invention to use polyether triols or polyether tetrols which have from about 5 to about 15 wt.% ethylene oxide added thereto in a final alkoxylation step by the known alkoxylation processes in order to increase the terminal primary hydroxyl content of the said polyether polyol. The manufacture of ethylene oxide "tipped" polyether polyols is generally discussed in U.S. Pat. No. 3,336,242.

As hereinbefore mentioned, the polyether polyol and the organic polyisocyanate are reacted to form the polyurethane composition. This reaction may occur noncatalytically when a polyol is used which contains tertiary nitrogen atoms or may be carried out in the presence of known polyurethane catalysts. The use of a separate catalyst is preferred. The catalyst employed may be any of the catalysts known to be useful for this purpose, including tertiary amines and metallic salts. Suitable tertiary amines include N-methylmorpholine, N-ethylmorpholine, triethylenediamine, triethylamine, trimethylamine and N-dimethylethanolamine. Typical metallic salts include, for example, the salts of antimony, tin, mercury and iron; for example, dibutyltin dilaurate, phenylmercuric acetate and stannous octoate. The catalyst is usually employed in a proportion of from about 0.01% to 2% by weight based on the weight of the overall composition.

Various additives can be employed to provide different properties, e.g., fillers such as clay, calcium carbonate, talc, or titanium dioxide. Dyes and pigments may be added for color and anti-oxidants also may be used.

When the embodiment of our invention is practiced which involves the production of the self-skinning cellular polyurethane product, a foaming agent is employed which may be any of those known to be useful for this purpose such as water, the halogenated hydrocarbons, and mixtures thereof. Typical halogenated hydrocarbons include but are not limited to monofluorotrichloromethane, difluorodichloromethane, 1,1,2-trichloro-1,2-fluoroethane, methylene chloride, and the like. The amount of foaming agent employed may be varied within a wide range. Generally, however, the halogenated hydrocarbons are employed in an amount from 1 to 50 parts by weight per 100 parts by weight of the polyol used in the production of the polyurethane composition. When water is employed as the blowing agent, it is present in the amount of from 0.1 to 10 parts by weight per 100 parts by weight of the polyether polyol. Halogenated hydrocarbon blowing agents for use in the production of a foamed polyurethane composition are discussed in U.S. Pat. No. 3,072,582.

When it is desired to practice our invention in producing a floor coating or sealant, it is often desirable to include therein a polyhydric cross-linking agent. Such cross-linking agents include, but are not limited to polyhydric alcohols such as glycerol, trimethylolpropane, 1,2,6-hexanetriol or pentaerythritol, or amines such as ethylenediamine, N,N,N',N'-tetrahydroxypropyl-ethylenediamine, and the like. These are included in the polyurethane composition such that they make up from about 0.02 wt.% to about 10 wt.% based upon the entire polyurethane composition. The use of such cross-linking agents is well-known and those skilled in the art will be able to readily determine the amount and type of cross-linking to use in order to achieve desired physical properties.

The chain-extending agent of our invention as described above is used in both solid polyurethane compositions and the self-skinning flexible or semi-flexible polyurethane foam composition. The amount of the chain-extending agent may be as low as 0.1 weight percent based on the polyol component in a solid elastomer polyurethane composition to about 50 weight percent of the entire formulation when used in the self-skinning foam polyurethane composition. It may be used either alone as the chain-extending agent or in conjunction with known chain-extending agents such as 1,4-butanediol, diethylene glycol, 4,4'-methylene bis(2-chloroaniline), and the like. However, we have discovered that whether used alone or in conjunction with known chain-extending agents, the chain-extender of our invention improves the tensile strength of the resulting polyurethane composition without detriment to other desired physical properties. When used in solid polyurethane compositions, the amount of 0.1 weight percent to about 15 weight percent, based upon the weight of the polyether polyol, and more preferably from about 0.5 to about 7 weight percent is employed.

In the production of the cellular self-skinning polyurethane compositions, the chain-extending agent used in the practice of our invention would be present in the amounts of from 10 weight percent to about 50 weight percent of the polyurethane reaction mixture, with preferred amounts being from about 15 weight percent to about 35 weight percent.

The chain-extender may be incorporated in the polyurethane compositions of our invention which are produced by either "one-shot" or prepolymer methods. In the "one-shot" system all the reactants and additives are mixed and reacted simultaneously. In the prepolymer system a portion of a polyhydroxy compound is reacted with the organic polyisocyanate to form a reaction product which has unreacted isocyanate groups. This reaction product is then mixed and reacted with the rest of the polymeric polyhydroxy compound to form the polyurethane composition.

In reacting the polymeric polyhydroxy compound with the organic polyisocyanate, the ratio of isocyanate groups to hydroxyl groups is between about 0.8 to about 1.5. This ratio, called the isocyanate index, is preferably between 0.9 and about 1.3 for the solid polyurethane composition and 0.8 to about 1.3 for the cellular self-skinning product. An especially preferred range for both polyurethane compositions is from about 0.95 to about 1.2. An isocyanate index of about 1.0 has been found to give very good products.

The following examples will more particularly illustrate our invention and should be considered for purposes of illustration only and not limitation thereof.

EXAMPLE I

To a 500 ml 3-necked round bottomed flask fitted with mechanical stirrer, thermometer, condenser and bubbler and $N_2$ inlet tube was added 65.8 g of compound III below (0.3 mole).

It was heated to 120° C. under $N_2$ purge and 0.3 mole isatoic anhydride (48.9 g) was added over a 15 minute period. The reaction mixture was heated to 150° C. and held there for 2 hours and 15 minutes. The mobile brown product weighed 103.4 g. Theory for 0.3 mole $CO_2$ loss (13.2 g loss) was 101.5 g. The product amine-amide contained 5.29 meq/g total titratable amine content and 0.027 meq/g tertiary amine content.

The reaction went as follows:

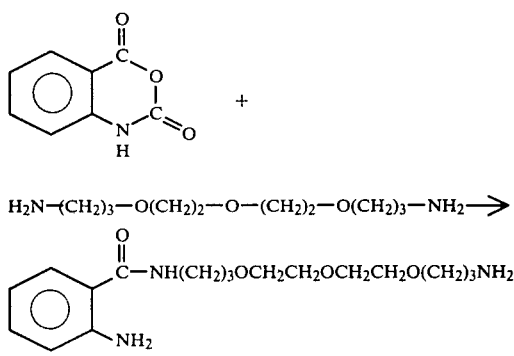

EXAMPLE II

To a 500 ml round bottom flask was added 43.8 g compound III (0.2 mole, or 0.4 equivalent) and it was heated to 120° C. under $N_2$. Then 65.2 g of IA (0.4 mole, 0.4 equivalent) was added over a 35 minute period (120°–138° C.). The reaction mixture was then heated to 150° C. and held there for 2 hours. The clear brown product weighed 91.6 g. Theory for 0.2 mole product (less the 0.4 mole $CO_2$ evolved) is $65.2+43.8=109.0$ g $-(0.4\times44)=109.0-17.6=91.4$ g. Theory=91.4 g. Actual observed=91.6 g. The product amine-amide contained 4.08 meq/g total amine content and 0.028 meq/g tertiary amine content.

The reaction proceeded as follows:

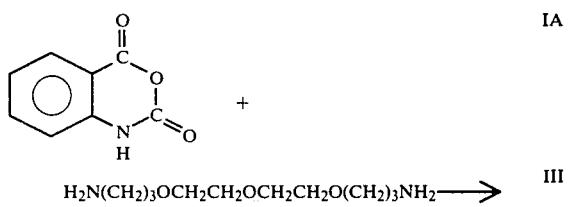

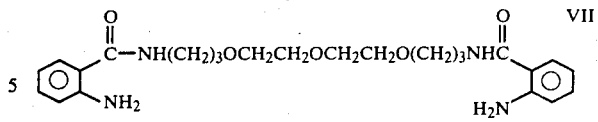

EXAMPLE III

To a 500 ml round bottom flask as in Example I, was added 61.7 g of diamine II below (0.3 mole, 0.6 equivalent) which was heated under a $N_2$ purge to 120° C., at which point 48.9 g of IA (0.3 mole, 0.3 equivalent) was added (spoon-wise) over a 5 minute period (120°–125° C.). After addition was completed the reaction mixture was heated to 150° C. and held there for 2½ hours. The clear, mobile brown product (hot) weighed 97.9 g. (Theory for 0.3 mole $CO_2$ loss is $61.7+48.9=110.6-13.2=97.4$ g).

The product amide IX containing both aromatic and aliphatic amine groups had a total titratable amine content of 5.65 meq/g and a tertiary amine content of 0.029 meq/g.

The reaction proceeded as follows:

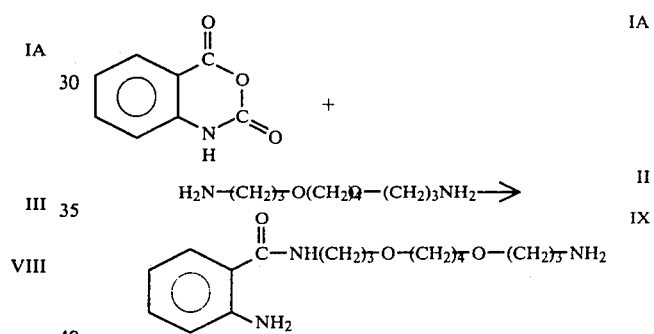

EXAMPLE IV

To a 500 ml round bottom flask, as in Example I, was added 41.2 g of diamine II (0.2 mole or 0.4 equivalent) and this was heated to 130° C. under $N_2$ purge. Then 65.2 g IA (0.4 mole, 0.4 equivalent) was added over a 30 minute period (130° C.–137° C.). After the addition of IA was complete, the reaction mixture was heated to 150°–52° C. and held there for 2½ hours. The clear brown product weighed 89.0 g. Theoretical product is $65.2+41.2=106.4$ less the 0.4 mole $CO_2$ evolved or 106.4–17.6 or 88.8 g theoretical. This compares very favorably with the 89.0 g actually observed. The product amide V containing 2 aromatic amine groups had a total titratable amine content of 4.25 meq/g and a tertiary amine content of 0.037 meq/g.

The reaction proceeded as follows:

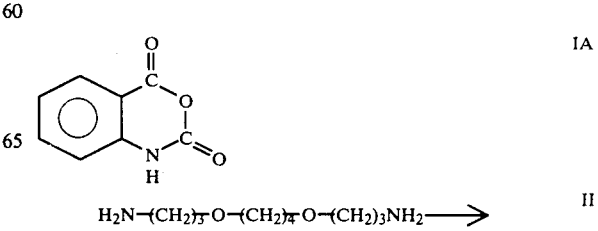

-continued

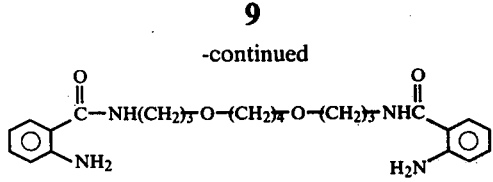

Flexible foams and other types of foams and elastomers are prepared from the above products of the invention and tensile and tear strength properties and elongation properties are improved though use of these chain-extenders.

The compositions of the invention are also useful as curing agents in epoxy resin formulations, and in addition are useful in a variety of end-uses where amines and/or amides may be employed.

We claim:

1. A compound of the formula:

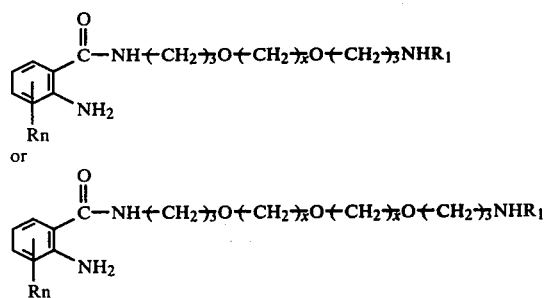

where R is selected from the group consisting of hydrogen, alkyl, nitro, halo, hydroxy, amino and cyano, n is a number of 1–4, x is a number of from 2 to 6 and $R_1$ is hydrogen or

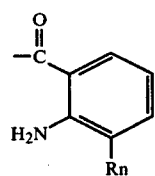

2. The compound of claim 1 which is

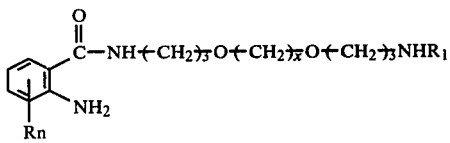

3. The compound of claim 1 which is

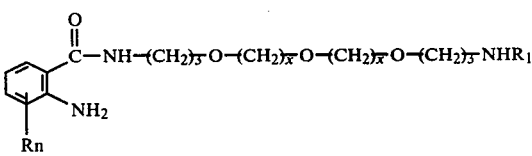

4. The compound of claim 2 where x is 4.
5. The compound of claim 3 where x is 2.

* * * * *